I. N. LOWENTHAL.
VEHICLE DIRECTION INDICATOR.
APPLICATION FILED JUNE 7, 1916.
1,263,578.
Patented Apr. 23, 1918.
2 SHEETS—SHEET 2.
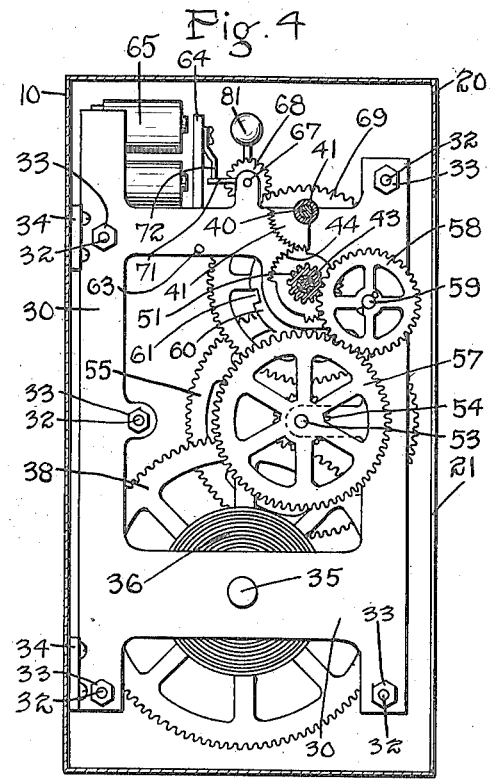
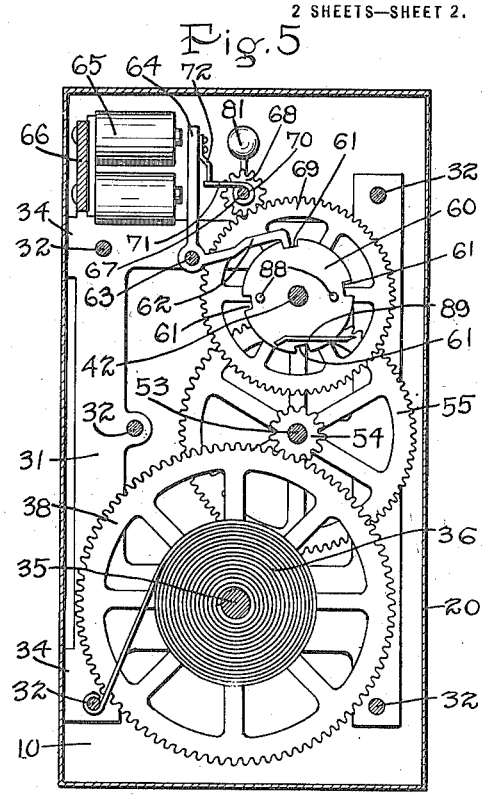
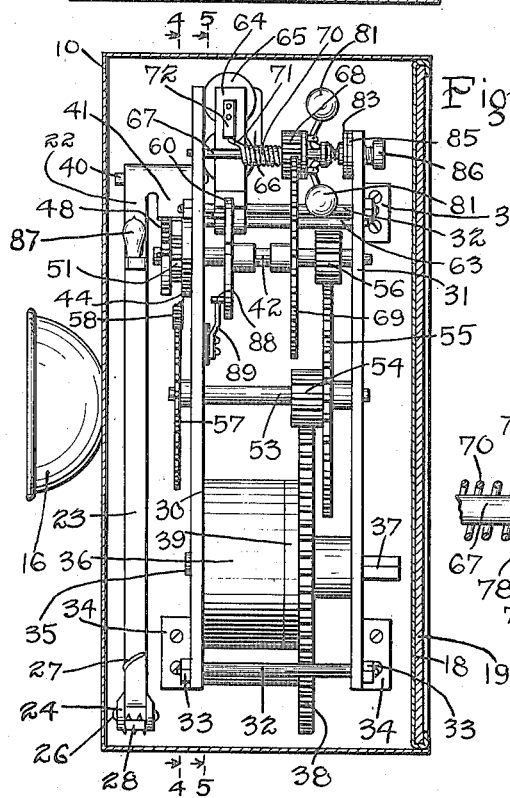
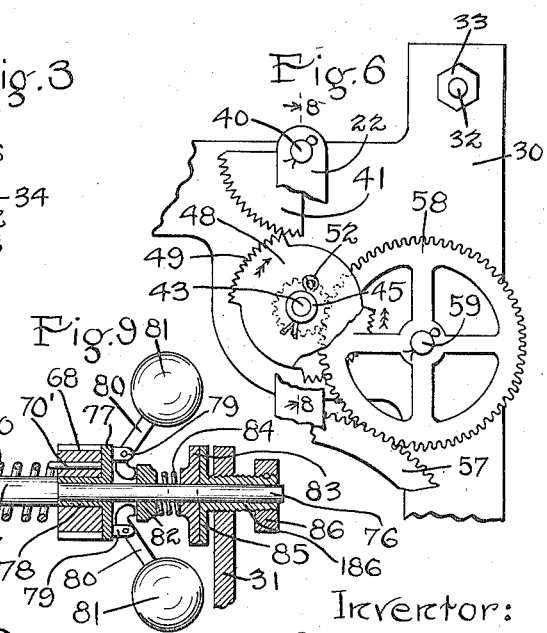
Inventor:
Israel N. Lowenthal
By G. A. Whiteley
his Attorney.

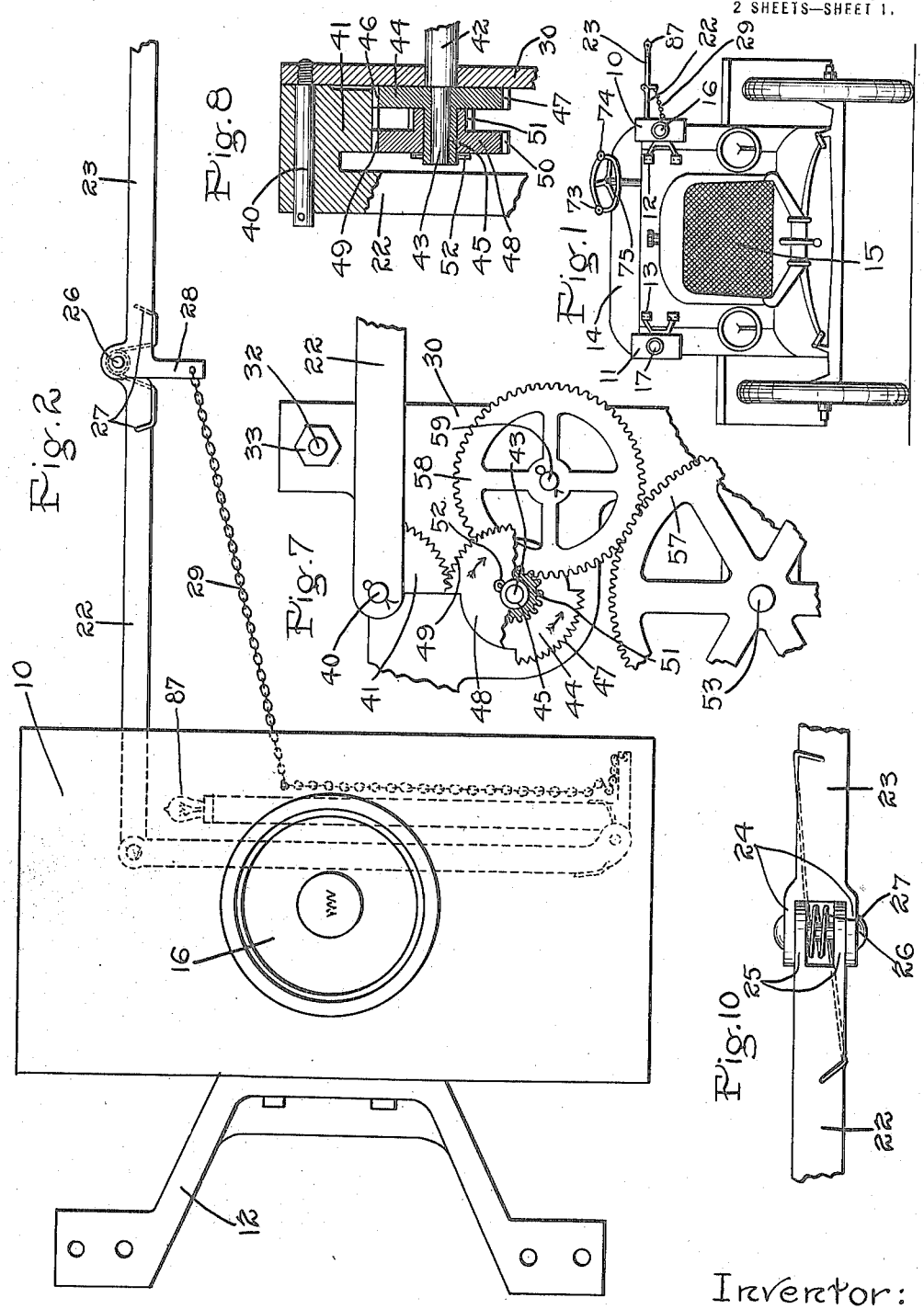

UNITED STATES PATENT OFFICE.

ISRAEL N. LOWENTHAL, OF MINNEAPOLIS, MINNESOTA.

VEHICLE DIRECTION-INDICATOR.

1,263,578.　　　　　Specification of Letters Patent.　　Patented Apr. 23, 1918.

Application filed June 7, 1916. Serial No. 102,227.

*To all whom it may concern:*

Be it known that I, ISRAEL N. LOWENTHAL, a citizen of the United States, residing at Minneapolis, in the county of Hennepin and State of Minnesota, have invented certain new and useful Improvements in Vehicle Direction-Indicators, of which the following is a specification.

My invention relates to direction indicators for vehicles and has for its principal object to provide on each side of the vehicle a casing with an arm pivoted thereto and adapted to be raised and lowered at will by the operator so as to be visible from both in front and behind the vehicle to indicate the direction the vehicle is to take.

A further object is to provide electrically-controlled means for first oscillating the arm upward and then lowering it by successively closing the same circuit. In carrying out this object I arrange a pair of oppositely-driven gears which have teeth only on portions of the periphery thereof to alternately engage and rotate a gear segment on which said arm is mounted. The driving mechanism is stopped by a suitable catch whenever the arm takes the correct position and may be released by an electromagnet controlled through an electric circuit.

Another object is to form the arm of two pieces pivoted to each other and adapted to fold up within the casing and to be extended in its full length when the same is raised.

The full objects and advantages of my invention will appear in connection with the detailed description thereof and are particularly pointed out in the claims.

In the drawings, illustrating the application of my invention in one form,—

Figure 1 is a front elevational view of an automobile showing the application of my invention. Fig. 2 is a front elevational view drawn to a larger scale of my invention detached from the automobile. Fig. 3 is a side elevational view of the indicator casing and mechanism shown in Fig. 2 with one wall of the casing and part of the gearing cut away. Fig. 4 is an elevational sectional view taken on line 4—4 of Fig. 3. Fig. 5 is a view similar to Fig. 4 taken on line 5—5 of Fig. 3. Figs. 6 and 7 are enlarged fragmentary views of the indicator arm operating mechanism showing the parts in relatively altered positions. Fig. 8 is a sectional view taken on line 8—8 of Fig. 6. Fig. 9 is an enlarged sectional elevational view of the governor shown in Fig. 3. Fig. 10 is an enlarged plan view of a part of the outstretched indicator arm shown in Fig. 2.

My invention as viewed from without is best shown in Figs. 1 and 2. A pair of rectangular casings 10 and 11 are secured by means of brackets 12 and 13 to the dashboard 14 or other suitable portion of a vehicle 15. These casings, as will be noted in Fig. 1, are placed in the positions occupied by the vehicle lamps and may be provided with other lamps 16 and 17 which take the place of the lamps displaced. The rear walls 18 of casings 10 and 11 which are hinged to these casings and serve as doors may be provided with mirrors 19 by means of which the driver may conveniently see images of objects in the rear of the vehicle, as most clearly shown in Fig. 3. In each casing is pivotally mounted an indicating arm which may be operated by a pair of electric push buttons 73 and 74 mounted on the steering wheel 75 of the vehicle or on a suitable bracket secured to the steering post.

As the operating mechanism contained within the casings 10 and 11 are substantially identical, that connected with casing 10 will alone be described in detail. The wall 20 of casing 10, as best shown in Fig. 4, is slotted at 21 throughout a portion of the length thereof to permit the indicator arm to be oscillated out of said casing. This arm comprises an inner section 22 which is pivoted within the casing and an outer section 23 pivoted to the end of the inner section, as follows. Section 23 is provided with a forced portion 24 which straddles a bifurcated portion 25 on the end of section 22 as shown in Fig. 10. A pin 26 passes through both of these portions and has mounted on it a short coil spring 27, the ends of which loop about the lower portions of the arm sections 22 and 23 adjacent said pivot and tend to cause said sections to be normally folded up or positioned as shown in dotted lines in Fig. 2. The section 23 is provided at its lower forked end 24 with an outwardly-projecting arm 28 which is connected by a chain 29 to the interior of the casing 10. When the section 22 is within the case 10 as shown in dotted lines in Fig. 2, the section 23 is folded up against it and the chain 29 hangs slack within the casing. As said section is oscillated and the arm swung outward the distance between the member 28 and the point of anchorage of said chain lengthens and the arm becomes straightened out as shown in full lines in Fig. 2. In this manner an arm of considerable length may be employed and the whole incased within a relatively small housing when said arm is not in its extended position. If desired, however, a single arm may be used, which necessitates removing a portion of the casing at the bottom to allow the arm to hang below the casing.

The means for driving the operating mechanism employed in oscillating arm 22 is best shown in Figs. 3 and 5 and comprises a spring motor of the following description. A pair of frame members 30 and 31 are held together in spaced relation to each other by means of a number of shouldered pins 32 on which may be screwed nuts 33. This frame is positioned within the casing 10 and is secured to one wall thereof by means of a number of ears 34 formed integral with said frame members and riveted to said wall. In the lower portion of this frame is journaled a shaft 35 to which is secured the inner end of a helical motor spring 36, the other end of which is attached to one of the shouldered pins 32 as clearly indicated in Fig. 5. Shaft 35 projects for some distance beyond frame member 31 and is formed at said protruding end with a squared head 37 by means of which the motor may be wound. A driving gear 38 is loosely mounted upon shaft 35 and is adapted to be connected therewith through suitable ratchet mechanism of usual construction situated at 39 but not shown in detail in the drawings.

The section 22 of the indicator arm is alternately oscillated a quarter of a turn in one direction and a quarter of a turn in the opposite direction to raise and lower said arm by a device now to be described. Said section 22 is pivoted to the frame member 30 on a pin 40 screwed thereto and is provided with a gear segment 41 of considerable width formed integral therewith and positioned to one side of said arm, as clearly shown in Figs. 6 and 8. A shaft 42 is journaled in frame members 30 and 31 and has an end 43 reduced in diameter and protruding beyond frame member 30. A gear 44 having teeth only at two opposed portions 46 and 47 of the periphery thereof is provided with a sleeve 45 which is mounted on the portion 43 of shaft 42 and extends throughout the length thereof. A second gear 48, similar to gear 44, having teeth at 49 and 50 has a pinion 51 secured thereto and is rotatably mounted upon the sleeve portion 45 of gear 44. A single pin 52 passes through sleeve 45 and the shaft end 43 and serves to secure gear 44 fast thereon and to hold gear 48 in place upon the sleeve 45. Both of the gears 44 and 48 are adapted to mesh with the gear segment 41. When these gears are rotated in opposite directions and positioned as shown in Fig. 6 they will alternately act upon the segment 41 and cause it to be rotated a quarter turn first in one direction and then in the other to raise and lower the indicating arm. This is possible for when either of the toothed portions 46 or 47 of gear 44 are in mesh with said segment one of the blank spaces between teeth 49 and 50 on gear 48 is opposite the same, and when the teeth 49 and 50 of gear 48 are in mesh with it a similar blank space on the gear 44 is opposite said segment. The positions of these gears which are superposed in the extreme positions of the indicating arm are clearly shown in Figs. 6 and 7.

Gears 44 and 48 are independently driven in opposite directions by the motor spring 36 in the following manner. A shaft 53 journaled in frame members 30 and 31 between shafts 35 and 42 has secured to it a pinion 54 which meshes with the drive gear 38 mounted on shaft 35. A gear 55 secured to shaft 53 near one end thereof meshes with a pinion 56 fast on shaft 42. In this manner the gear 44 is driven through shaft 42, rotating in the direction indicated by the arrow shown in Fig. 7. Shaft 53 extends out beyond frame member 30 and has secured to its protruding end a gear 57 meshing with an idler gear 58 pivoted to a pin 59 secured to the frame member 30. Idler 58 in turn meshes with the pinion 51 secured to gear 48 as previously mentioned, thus driving said gear from shaft 53 in a direction opposite to gear 44, as clearly indicated in Fig. 7. The ratio of the diameters of gear 57 and pinion 51 must be equal to that of gear 55 and pinion 56 in order to cause gears 48 and 44 to rotate at the same speed.

In order to cause the indicating arm to be alternately raised and lowered the movement of shaft 42 must be arrested every quarter of a revolution. For this purpose a circular disk 60 is provided as clearly shown in Figs. 3 and 5, which is secured to shaft 42. Disk 60 has cut in its periphery four notches 61 in which a lever 62 pivoted to the frame on a shaft 63 may drop. This lever is formed integral with a magnet armature 64 positioned to be attracted by an electromagnet 65 secured to an ear 66 bent back from the frame member 30. A shaft 67 journaled in frame members 30 and 31 in close proximity to said magnet has secured to it a pinion 68 meshing with a gear 69 fast on shaft 42. Shaft 67 has coiled about it a spring 70 with one end 70' secured to pinion 68 and the other end 71 free and projecting out beyond said shaft. The end 71 sweeps past armature 64 and its motion is arrested by a piece 72 secured to said armature when the armature is released and the lever 62 lodged in one of the notches 61 in disk 60, which piece is disengaged from the spring end 71 when the magnet armature 64 is drawn up, leaving the mechanism free to operate. By means of this spring the motor may be abruptly stopped without injury to the same. It hence becomes obvious that by successively pushing the button 74 which controls magnet 65 through a suitable electric circuit, the indicating arm can be made to be raised and lowered at will. In this manner a single button is used for each device. By continuously pressing either of the buttons 73 or 74 the corresponding arm will be first raised and will then immediately be lowered. If desired an electric motor can be used instead of the spring motor.

To cause the indicating arm to operate at a suitable speed, a speed governor is employed which is mounted on shaft 67 and is shown in detail in Fig. 9. The end 76 of shaft 67 which passes through the frame member 31 is reduced in diameter and has the governor mounted thereon. A disk 77 is provided with a sleeve 78 on which gear 68 is mounted, both the gear and this sleeve being pinned to the shaft. Disk 77 is further provided with a pair of ears 79 to which are pivoted arms 80 having ordinary weighted balls 81 secured to the ends thereof. Arms 80 are formed at their inner portions so as to advance a collar 82 along shaft end 76 as the balls 81 fly outward. A disk 83 is splined to shaft end 76 and may be advanced along said shaft by collar 82 through a coil spring 84 interposed between said disk and collar. Disk 83 engages a similar disk 85 formed on a sleeve 186 screwed into frame member 31. This sleeve serves as a journal for shaft 67 and has secured to its outer end a hand nut 86 by means of which the disk 85 may be rotated. In this manner the indicating arm can be made to travel at any desired speed, as the initial friction between the disks 83 and 85 can be varied at will by means of nut 86.

Upon the end of the arm section 23, as best shown in Figs. 1 and 3, is mounted an electric light bulb 87. This light is of course only used in the dark and is caused to be illuminated only when the arm reaches its outstretched position. To effect this a pair of pins 88 are secured to the disk 60 which serve as contact members and engage a spring contact member 89 insulated from and secured to the frame member 30. The light bulb 87 is connected into a circuit with the contact members 88 and 89 so that every time the indicating arm is outstretched the lamp is lighted up, and when the arm is drawn into its housing the light is put out.

The advantages of my invention are manifest. The ease and simplicity of operation of the device render it exceedingly effective, and the application of the head light and mirror to the casing give it a threefold utility. By opening the mirror door all of the parts become accessible and the winding and adjusting may be done with great facility.

I claim:

1. A direction indicator for vehicles comprising a privoted arm, means for supporting said arm upon a vehicle, a pair of rotatable members adapted to be simultaneously driven in opposite directions, and means on said members alternately engaging said pivoted arm to cause the same to be successively oscillated in opposite directions.

2. A direction indicator for vehicles comprising a pivoted arm, means for supporting said arm upon a vehicle, a pair of rotatable members adapted to be simultaneously driven in opposite directions, and a pair of operative portions formed on each of said members for successively engaging the arm to alternately oscillate it in opposite directions.

3. A direction indicator comprising a pivoted arm, gear teeth on said arm, a shaft, a pair of gears mounted on said shaft having teeth on portions of the periphery thereof and blank spaces on other portions, and means for rotating said gears in opposite directions, said teeth and blank spaces being so disposed that one set of teeth on each gear alternately engage the teeth on the arm to cause the arm to alternately oscillate in opposite directions.

4. A direction indicator for vehicles comprising a pivoted arm, means for supporting said arm upon a vehicle, a pair of members moving in opposite directions, means on said arm alternately engaged with said members for alternately oscillating said arm in opposite directions, and means for arresting the movement of said movable members at the extreme positions of said pivoted arm.

5. A direction indicator for vehicles comprising a pivoted arm, means for supporting said arm upon a vehicle, a shaft, a pair of rotatable members mounted on said shaft, means for rotating said members in opposite directions, means on said arm alternately engaged with said members for alternately oscillating said arm in opposite directions, and means for rendering said rotatable members inoperative at the extreme positions of the arm.

6. A direction indicator for vehicles comprising a pivoted arm, means for supporting said arm upon a vehicle, a shaft, a pair of oppositely rotating members on said shaft for alternately oscillating the arm in opposite directions, a notched disk on the shaft, and means engaging said notched disk for stopping the shaft when the arm is at its extreme positions.

7. A direction indicator for vehicles comprising a pivoted arm, means for supporting said arm upon a vehicle, a shaft, a pair of oppositely rotating members on the shaft for alternately oscillating the arm in opposite directions, a notched disk on the shaft, a lever adapted to ride on said disk and fall in to said notches, means associated with said lever for stopping the shaft when the lever drops into a notch, and a means for simultaneously releasing the shaft and restoring the lever.

8. A direction indicator for vehicles comprising a pivoted arm, means for supporting said arm upon a vehicle, a forearm pivoted to said last-named arm, a spring for causing said arms to be folded up substantially in alinement at one position of the same, means acting against said spring for causing said arms to be outstretched in another position of the same, and a pair of oppositely rotating members alternately engaged with said pivoted arm for oscillating the same.

9. A direction indicator comprising a casing, an arm pivoted to said casing, a forearm pivoted to said first-named arm, a spring for causing said arms to be folded up in substantial alinement when the arms are within the casing, a slot in the casing through which said first-named arm may be projected, a lever on said forearm, a chain connecting said lever with said casing, and means for oscillating said first-named arm so that when the same is projected through the casing the chain is caused to act upon the lever to bring the forearm in outstretched position relative to the first-named arm.

10. A direction indicator for vehicles comprising a pivoted arm provided with gear teeth, means for supporting said arm upon a vehicle, a shaft mounted in said supporting means, a pair of gears one of which is secured to said shaft and the other of which is rotatably mounted thereon, each of said gears having teeth on portions of the periphery thereof and blank spaces on other portions, said teeth and blank spaces being so disposed that the teeth on each gear alternately engage the teeth on the arm, a motor, gearing operated by said motor for rotating said gears in opposite directions, and a speed governor operatively connected with said shaft for controlling its speed of rotation.

In testimony whereof I affix my signature in presence of two witnesses.

ISRAEL N. LOWENTHAL.

Witnesses:
F. A. WHITELEY,
H. A. BOWMAN.